Figure 1:
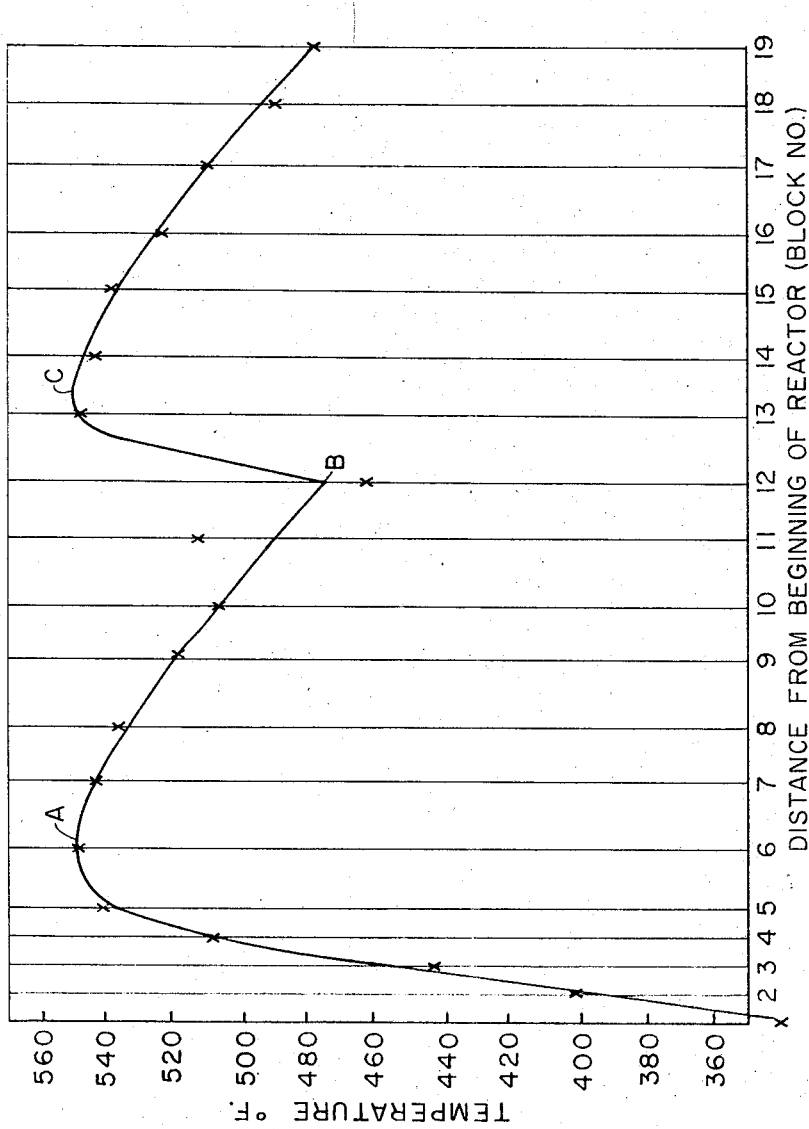

FIG. I

INVENTORS
MICHAEL ERCHAK, JR.
KENNETH W. DOAK
BY ROBERT M. DOUGLAS

United States Patent Office 3,293,233
Patented Dec. 20, 1966

3,293,233
PROCESS FOR POLYMERIZING ETHYLENE AT HIGH PRESSURES IN THE PRESENCE OF A MIXTURE OF PEROXIDES HAVING DIFFERENT HALF LIVES
Michael Erchak, Jr., Ridgewood, Kenneth W. Doak, Wyckoff, and Robert M. Douglas, Dumont, N.J., assignors to Rexall Drug and Chemical Company, Los Angeles, Calif., a corporation of California
Filed Apr. 9, 1963, Ser. No. 271,660
4 Claims. (Cl. 260—94.9)

This invention relates to a process for polymerizing ethylene at elevated temperatures and pressures, said polymerization being conducted in a pressure resistant tubular reactor and in the presence of initiators which decompose at a temperature range useful in the polymerization reaction.

In the polymerization of ethylene at pressures in the order of at least 15,000 p.s.i. and temperatures of from 225° to 600° F., it has been customary to introduce ethylene into a high pressure resistant vessel exemplified, in one area of this technology, by an elongated tube and conducting the polymerization by introducing an initiator at the ethylene inlet end of the reactor and flowing the mixture under pressure to the exit end of the tube where unreacted ethylene and polymer product are let down to lower pressures in a suitable catch pot. In these prior art techniques, oxygen or a peroxide (organic or inorganic) was usually employed as the initiator. Conversions of ethylene to solid polymer were usually low, but could vary depending on many conditions in the reactor, such as ethylene velocity, amount of initiator and pressures and temperatures employed.

It has not been simple to significantly increase conversion of ethylene to solid polymer in these prior art tubular reactor processes, and consequently, the percent conversion of ethylene to polymer has not been reported drastically increased in commercial processes after many years of high pressure polyethylene manufacture. Thus, in many prior art references wherein oxygen or a peroxide is indicated as the initiator used, reported conversions of ethylene to polymer range from 5–12%, although higher conversions have been reported in systems other than the one with which this invention is concerned.

It is an object of this invention to provide a process for polymerizing ethylene wherein increased conversions in the order of a few percent can be readily attained by operating according to the process described.

It is a further object of this invention to provide a process wherein not only are increased conversions obtained, but wherein polymer properties are unexpectedly improved.

A still further object of this invention is the provision of a process which is capable of producing resins having improved physical properties in comparison with those prepared by a process not incorporating the novel features of this invention and wherein process variables can be more readily controlled as set forth below.

In accordance with the foregoing, there is provided a process for polymerizing ethylene in a pressure resistant highly elongated tubular reactor containing along the length of the reactor a plurality of spaced apart initiator introduction points, said process comprising continuously introducing ethylene at one end of said reactor at a pressure of at least 15,000 p.s.i. and continuously conducting the polymerization thereof in the presence of an initiator mixture at a temperature of from 225° to 600° F., said initiator mixture having been introduced into the reactor at at least two separate points along the length thereof, the initiators being of the type which decompose at different rates at a given temperature, and at least two such initiators being introduced to the reactor.

For the purpose of this invention, the following terms as used throughout the specification and the claims are intended to have the following meaning: (a) "plurality" with reference to initiator injection points, is understood to mean at least two points along the length of a tubular reactor; (b) "tubular" means an elongated reaction zone of a high length to the diameter ratio, preferably a tubular reactor whose length to diameter ratio varies from about 100:1 to 100,000:1; (c) "initiator" is intended to mean an organic or inorganic peroxide, oxygen, or a compound which liberates free radicals at the pressures and temperatures indicated and which causes by liberation of such free radicals, polymerization of a monomer such as ethylene. In addition to including organic and inorganic peroxides, initiators include a large variety of free radical initiators such as azonitriles, disclosed in U.S. Patent 2,471,959, metal alkyls or organometallic compounds so long as these function according to the process of the invention, that is, to initiate free radicals, as will be described more fully herein; (d) by the term, "half-life" is meant the time it takes to reduce a given concentration of peroxide to one half of the original concentration at a defined temperature. This definition is well known in the art of certain initiators such as peroxides; (e) "temperature profile" as used in this specification, means the curve or line obtained by placing temperature sensing elements along the length of the reactor and plotting the readings taken at suitable time intervals (or continuously by electronic means) during the reaction.

This invention, for the sake of simplicity, will be described with reference to the use of peroxide initiators of the organic type for the polymerization of ethylene since this forms the preferred embodiment hereof.

Figure 2:
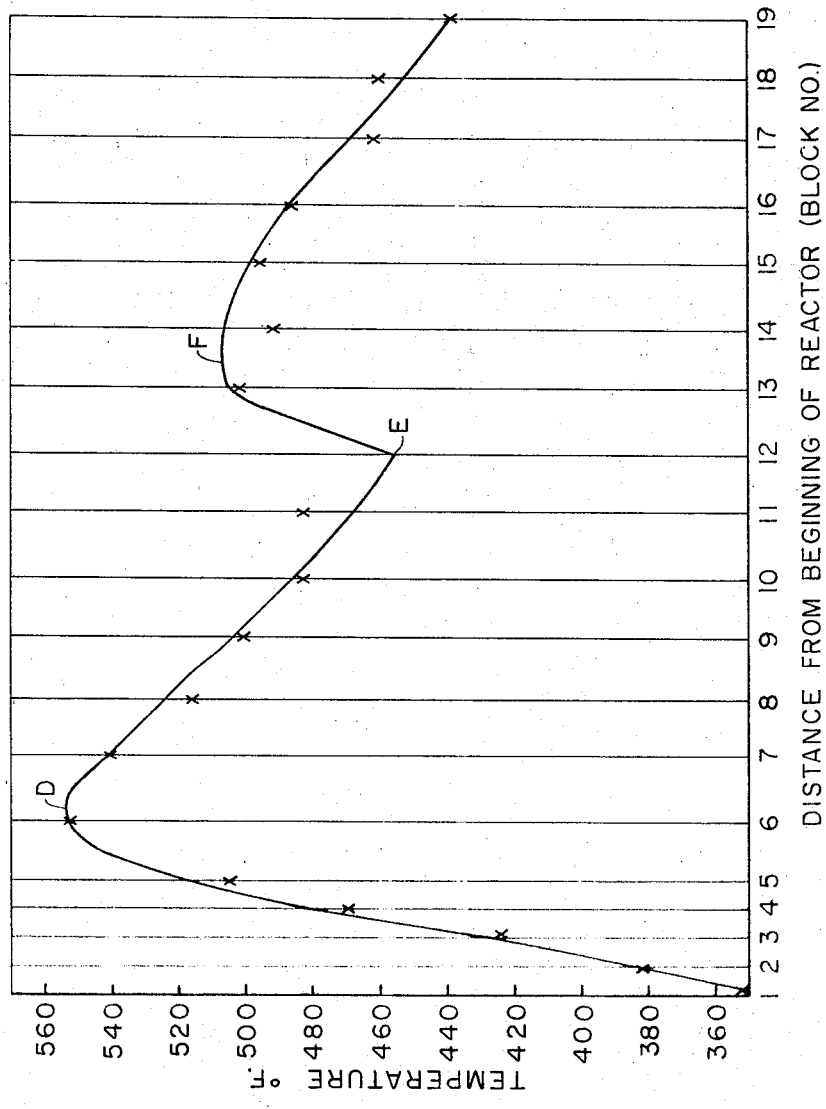

The attached drawings, FIGURES 1 and 2, which form a part of this invention, illustrate temperature profile curves exemplary of the process of this invention.

Briefly, the process of this invention can be described as one wherein ethylene at pressures of at least 15,000 p.s.i., but up to 100,000 p.s.i. is introduced into a pressure resistant, highly elongated tubular reactor at one end thereof and wherein initiator mixtures are introduced along the length of the reactor at spaced apart points, one preferably immediately following the ethylene inlet vicinity and the second or third at distances which vary depending on various factors, including the temperature peak resulting from the first initiator mixture introduced. More than two initiator injection points can be employed according to the process of this invention, that is, three or four, depending on the length of the tube, heat transfer and increase in percent conversion desired, as well as polymer properties. Reference will be made in this specification to only a two point initiator injection to simplify the understanding of the process herein.

In a preferred embodiment of this invention, the first mixture of initiators introduced will contain two or more different initiators which are introduced nearest the ethylene inlet end of the reactor. This mixture of initiators comprises those rich in low temperature peroxides which have a 10 hour half-life at temperatures of from 110° to 175° F. The second initiator mixture, which is introduced at a second point spaced apart from the first and preferably after cooling of the partially reacted ethylene-polymer product to a suitable temperature, is a mixture rich in those peroxides having a 10 hour half-life of above 175° F. For simplicity in describing the types of initiators used according to the process of this invention, a third type is classified as having a 10 hour half-life at temperatures above 250° F. These initiators are conveniently classified according to their 10 hour half-life at temperatures as follows: Type I: 110°–175° F.; Type II: 175°–250° F.; Type III: 250°–320° F. Initiators falling within these categories have been found most useful for polymerizing ethylene. Data are available in the literature on half-lives of numerous peroxides, such data indicating half-life in minutes or hours (see for example, "British Plastics," January 1963, p. 40).

In accordance with this invention, it is not required that a mixture of initiators rich in Type II follow a mixture rich in Type I in the polymerization reaction, since it is within the scope herein to use as a first mixture one or more initiators of the Types I, II and III followed by the introduction of a second initiator mixture of the Types II and III or Type III indicated above. The choice of introducing mixtures of one type or another will depend on the reactor temperature profile and on other conditions existing during the polymerization reaction. By a mixture rich in one type or another is meant that the initiator mixture contains a major amount of that component type as compared to the other individual types present therein. Initiators are introduced continuously and substantially simultaneously once the reaction is lined out.

For a better understanding of this invention, reference is made to FIGURES 1 and 2 which illustrate a two point initiator injection in the polymerization of ethylene in a tubular reactor and the resulting temperature curves along the reactor as plotted from readings of temperature sensing elements placed thereon.

FIGURE 1 illustrates an ethylene polymerization run conducted at 27,000 p.s.i. wherein the first initiator mixture introduced near the inlet ethylene end had the following molar ratio: Lauroyl peroxide (Type I) 3.1:t-butyl peroxyisobutyrate (also Type I) 3.5:t-butyl peroxyacetate (Type II) 1.0:t-butyl peroxide (Type III) 0.4. The ethylene feed temperature at the first initiator introduction point was from 337° to 345° F. The second initiator introduced occurred downstream of the first after the peak temperature of about 550° occurred as illustrated by the curve A. The second mixture was composed of the following initiators (molar ratios): t-butyl peroxyacetate Type II 1.0:t-butyl peroxide Type III 0.2 and was introduced at a point B where the ethylene-polymer mixture was at a temperature of approximately 472° F. This second initiator mixture caused a temperature peak of about 550° F. as shown by curve C and this was followed by cooling to an exit temperature of about 480° F. In this example, it is shown that different initiator mixtures can be used and that both temperature peaks can be made to rise an equivalent amount.

FIGURE 2 illustrates another run wherein ethylene polymerization was conducted at 35,000 p.s.i. and the second temperature peak was kept at a lower temperature level than the first. The initiator mixture for this run is described in Run Number 2 of Example 1 below. It will be noted from FIGURE 2 that the first peak temperature, indicated at curve D, was about 550° F. Initiator introduction occurred at point E and this caused the temperature to rise to about 510° F., indicated at curve F. (Note: For both of these figures, only the average peak level is indicated. In the actual runs, the temperature peaks varied up or down about 5 to 10° F. and the ethylene inlet temperature was likewise varied this amount. This is illustrated in the examples by giving the range of the ethylene temperature at the first and second injection points, as well as the range of peak temperatures, etc.)

The FIGURES 1 and 2 illustrate only a few of the many variations which the process of this invention is capable of in operation (that is, ethylene injection temperatures, different initiator mixtures, different temperature peaks for the two figures shown, etc.).

As illustrated above (by reference to the attached drawings of two temperature profiles) the introduction of an initiator or initiator mixtures to the reaction zone is governed by the temperature existing at any one of a plurality of introduction points and the type and amount of initiator to be introduced. The temperature existing at any one of the introduction points can be varied at will by several factors including sensible heat of the incoming ethylene, heat transfer to a cooling medium, and amount and type of initiator initially introduced at the vicinity near the inlet ethylene end. Accordingly, a temperature profile can be made to assume a variety of controlled shapes, depending on various production factors. Thus, where a high temperature peak is initially desired in order to obtain increased conversion, a first initiator mixture rich in Type I initiators is introduced, so that the polymerization temperature will rise quickly to a peak as high, for example, as 575° F. Where a lower peak temperature is desired to obtain certain polymer properties, the ethylene inlet temperature can be lowered as well as the concentration of initiator, so that a peak temperature, for example, of 450° F. is obtained. The peak temperatures can also be moved from one area of the reactor to another as will be apparent from the drawings herein. After the first peak temperature, according to the process of this invention, a second initiator mixture can be introduced at a point downstream of the first injection point in an area chosen to give a maximum temperature difference between injection and peak temperature. The location of this second injection point can be from about 55 to 65 percent of the total reactor length, although this can vary widely and it is therefore impractical to assign precise linear distances to such locations. A third injection point can be suitably located after the second. The introduction of the second initiator mixture can, for example, be at any of various locations along the length of the reactor, provided only that it is not so near to the exit end of the reactor since an undue rise in temperature might occur. Ordinarily, it is desired to discharge the reactor products into the high pressure catch pot at a temperature of about 475°–500° F. Therefore, it can be seen that depending on the amount of cooling immediately after the initial temperature peak and/or on the type and amount of initiator that any one of severally placed introduction points can be used for the second or even a third injection point.

It is not necessary, according to the process of this invention, that there be a continuous presence of initiators from one point of initiator introduction to the next point. Thus, the first initiator introduced can, after the first temperature peak (which results from initiation of the reaction and the exothermicity thereof), be substantially used and the reaction substantially terminated prior to introduction of a second initiator(s) at a point downstream of the first. The second initiator mixture introduced is preferably rich in Type II or III depending on the temperature existing at the introduction point. Thus, one type of initiator is used for one set of conditions and temperatures followed by higher temperature initiators so that controlled peaks and valleys can be made to occur on the reactor temperature profile.

The employment of various initiator types as set forth above permits variation of reaction conditions and control of temperature profile so that the production of desired polymer properties is facilitated. Thus, ethylene can be introduced to the reactor at various temperatures, for example, at temperatures as low as 225° F. to as high as 350° F. depending on ultimate conversion desired and polymer target properties. Likewise, initiators introduced initially can be correlated with ethylene sensible heat, and pressure, and the amount, type and mole ratio of the initiators varied accordingly.

It is within the scope of this invention to manipulate the introduction of initiator mixtures so that a continuous supply of initiators is provided to critical portions of the temperature profile curve. By virtue of the use of initiators which decompose at different rates at different temperatures, it is possible to provide an initiator type for each critical temperature segment of the curve. Thus, where the temperature in the reactor at any point is within a range such as 225° to 350° F., it is preferred to introduce a mixture rich in Type I and to vary the amount depending on whether a steep temperature peak is desired or a more gradual one further away from the ethylene inlet end. Thereafter, depending on the amount of heat removed and the resulting temperature, for example, 440° to 470° F., a mixture rich in Type II or Type III or mixtures of these can be used to obtain a second desired temperature rise. As noted hereinbefore, the first initiator mixture introduced can be composed of Types I, II and III, but richer in Type I. As a matter of fact, such a mixture is preferred in some instances due to the nature of the initial temperature peak, that is, a steep curve which makes use of the various useful decomposition rates of the types of initiators present. It can thus be seen that varying mixtures and types of initiators can be employed at two or more points along the length of the reactor to obtain the desired operation goals.

The useful decomposition range of the initiators employed should preferably overlap each other. Thus, at any given temperature range, one particular type is predominantly useful and continues so, well unto the useful range of the next type, etc. Such overlaps are preferred as they allow a wide choice of useful types and quantities to be selected.

Exemplary initiators which can be employed in the process of this invention and representative of Type I with a 10 hour half-life at temperatures of 110° to 175° F. are: 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxydicarbonate, acetyl peroxide, decanoyl peroxide and t-butyl peroxypivalate. Exemplary of Type II initiators whose 10 hour half-lives fall at temperatures from 175° to 250° F. are: t-butyl peroxyacetate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide and cyclohexanone peroxide. Exemplary of Type III initiators whose 10 hour half-lives fall at temperatures from 250° to 320° F. are: p-menthane hydroperoxide, pinane hydroperoxide, cumene hydroperoxide, t-butyl peroxide and 2,5-dimethyl hexane-2,5-dihydroperoxide. The types of peroxides named are illustrative of those falling within the definition herein adopted and do not include a complete enumeration of all the various peroxides within the scope of the definition.

In practicing the process of this invention, the initiator molar ratios for each introduction point will vary where two or more types are introduced at two or more points along the length of the reactor. It is not practical, however, to define precise molar ratios of Types I, II and III for one introduction point since these ratios will depend on the type and amount introduced at a second point, etc., and since in many instances only one or two types need be used at each introduction point. The examples presented herein illustrate this point very clearly and illustrate suitable molar ratios for the particular objective of each run.

The total concentration of the initiators Types I, II and III introduced at two or more points along the length of the reactor will also vary according to operating pressures and temperatures. Thus, for polymerizations carried out at minimum pressures of about 15,000 p.s.i., as high as about 500 parts per million on an ethylene molar basis can be used while for pressures of about 40,000 p.s.i. to 45,000 p.s.i. and higher, that is to 60,000 p.s.i., the concentration can be reduced suitably to as low as about 5 parts per million on an ethylene molar basis.

It is desirable, according to the process of this invention, to use solvents for the various initiators which can be solids or liquids. As solvents for the initiators, it has been found that suitable compositions are those of the hydrocarbon class, for example, paraffinic hydrocarbons such as pentane, hexane, heptane, cyclohexane and the like or aromatic hydrocarbons such as benzene and toluene. Preferred solvents for the initiators are mixtures of one or more paraffinic hydrocarbons with an aromatic hydrocarbon. The combination of a paraffinic and aromatic solvent imparts improved solubility to the solid peroxides without freezing when used at elevated pressures. A suitable mixture is hexane and benzene in proportions of from 35 to 50% hexane with from 50 to 65% benzene. According to the process herein, a solution of the initiators in hydrocarbons can be injected by suitable pump or pumps at two or more points along the length of the reactor.

Polymers of ethylene with optimum properties have been obtained by the process of this invention when certain chain transfer agents have been employed in the high pressure polymerization reaction. Chain transfer agents for use herein can be hydrogen or saturated hydrocarbons, for example, propane, butane, isobutane, pentane, hexane, heptane, alicyclic hydrocarbons such as cyclohexane, methylcyclohexane, cyclopentane, aromatic hydrocarbons, chlorinated hydrocarbons and aldehydes. Included herewith are also saturated aliphatic alcohols containing from 1 to 6 carbon atoms and higher specifically primary and secondary alcohols of from 3 to 5 carbon atoms. Primary alcohols include such as methanol, ethanol, propanol, n-butanol, pentanol, hexanol, while secondary and other alcohols include isopropanol, isobutanol, secondary butanol, pentanol-1, etc. Chain transfer agents can be used in admixture with ethylene in proportions of from about 0.2 to about 6 mol percent (up to 10% for propane) based on total ethylene.

In addition to the foregoing chain transfer agents, aliphatic ketones in approximately the same molar proportion can also be employed. Preferred are those ketones containing from 3 to 10 carbon atoms and preferably from 3 to 5 carbon atoms such as acetone, diethyl ketone, diamyl ketone, diisobutyl ketone, methyl ethyl ketone, methyl isopropyl ketone, ethylbutyl ketone, ethylpropyl ketone and the like. Also aldehydes of approximately the same number of carbon atoms can be used. Illustrative of these are formaldehyde, acetaldehyde, n-valeraldehyde, etc. Aldehydes can be used in molar proportion to ethylene of from .05 or lower to 3 mol percent based on total ethylene.

In addition to the foregoing chain transfer agents, the process of this invention is applicable to copolymerization reactions involving ethylenically unsaturated hydrocarbons such as unsaturated olefins of from 3 to 10 or more carbon atoms, exemplary of such olefins being propylene, isobutylene, butene-1, hexene-1, 3-methylbutene-1, 4-methylbutene-1, octene-1, nonene-1, etc. It is usually desirable to employ from .01 to 4 mol percent and preferably from 0.2 to 3 mol percent of the total ethylene of such unsaturated olefins, depending on the melt index desired at the pressure being used. It should be mentioned at this point that unsaturated olefins have been noted to function as chain transfer agents.

Although the examples presented hereinbelow show the use of certain comonomers such as the unsaturated olefins, other polymerizable ethylenically unsaturated monomers which have a terminal vinyl type $CH_2=C<$ group can also be used in this process. Examples of such compounds are acrylic and methacrylic acids, substituted acrylic compounds and esters of acrylic and methacrylic acids, such as methyl, ethyl, stearyl and the like esters, vinyl and vinylidene compounds, for example, vinyl chloride, vinylidene chloride, vinyl carboxylates such as vinyl acetate, vinyl propionate and substituted vinyl compounds such as vinyl compounds containing a nitrogen group. Others include such compounds as styrene, alpha chlorostyrene, vinyl naphthalene; vinyl ethers such as vinyl methyl ether, vinyl butyl ether; vinyl ketones such as vinyl ethyl ketone, etc.

Any combination of the above can also be used, for example, hexane and propylene to produce polymers and copolymers of certain desired physical properties.

The test methods employed for determining polymer properties are those standard in the plastics industry. The percent haze is determined by ASTM D-1003-56T, while the percent gloss is measured at 60° angle incident light with a Gardner gloss meter. Density is determined by the procedure of ASTM D-1505-60T and melt index according to ASTM D-1238-57T.

The following examples are illustrative of this invention:

EXAMPLE I

This example demonstrates two runs, one made with a single point injection, and the other with multipoint injection (2) according to the process herein. The two runs were made under as near identical conditions as possible.

| Synthesis Conditions | Run Number | |
|---|---|---|
| | 1 | 2 |
| Reaction Pressure, p.s.i. | 35,000 | 35,000 |
| Initiator Composition (Molar basis)* | | |
| First Injection Point: | | |
| Lauroyl peroxide | 3.0 | 3.0 |
| t-Butyl peroxyisobutyrate | 2.0 | 2.0 |
| t-Butyl peroxyacetate | 1.0 | 1.0 |
| t-Butyl peroxide | 0.50 | 0.50 |
| Second Injection Point: | | |
| Lauroyl peroxide | | 0 |
| t-Butyl peroxyisobutyrate | | 0 |
| t-Butyl peroxyacetate | | 1.0 |
| t-Butyl peroxide | | 0.2 |
| Injection Temperature ° F. (Range): | | |
| First point | 350-357 | 350-355 |
| Peak Temperature ° F. (after first injection point) (range) | 550-558 | 549-554 |
| Injection Temperature ° F.: | | |
| Second point (range) | | 448-460 |
| Peak Temperature ° F. (after second injection point) (range) | | 497-517 |
| Modifier, propylene, mole percent (range) | .90-1.20 | 1.18-1.38 |
| Conversion, percent | 9.8 | 12.4 |
| Polymer Characteristics: | | |
| Density gm./cm.³ at 23° C | .924 | .923 |
| Melt Index (gm./10 min.) range | 1.3-2.5 | 1.0-2.9 |

*Type II initiator (t-butyl peroxyacetate) arbitrarily selected as the reference for the molar ratios.

The above example demonstrates very clearly the increase in percent conversion when operating according to the teachings herein. It must be pointed out that the use of multi-peroxide initiators, even with single point injection, leads to increased conversions over the use of a single initiator (peroxide) and under proper operating conditions higher conversions than that shown above can be obtained; however, under as nearly identical conditions of operation as possible, the multipoint injection system is superior to the single point (using multi-peroxide initiator compositions) insofar as consistently leading to increased conversion in the order of two percent or higher and in some ultimate properties of the resin, processed or raw, as will be indicated below.

Resin from Runs 1 and 2 above (uncompounded) was processed into clear film and the following property measurements were made:

| Property | Run 1 | Run 2 |
|---|---|---|
| Haze | 10.9 | 8.1 |
| Gloss | 8.0 | 8.7 |
| Long Chain Branching Index | 2.35 | 2.45 |

As will be noted, the haze and gloss values for the uncompounded polymers are better for Run 2 where a two point injection system was used. Several comparative runs other than those shown proved this observation to be consistent. A further observation made after several of these runs was that long chain branching increased with polymers prepared with two point injection of initiator, particularly at synthesis pressures below about 35,000 p.s.i. The long chain branching characteristics of the polymer are determined from extrudate swelling which is the ability of the molten polymer to swell as it emerges from a given orifice at a fixed temperature and shear. (Determined by measurements on a high shear viscometer.) Basic polymer considerations suggest that extrudate swelling is a measure of melt elasticity which in turn is related to the degree of branching, particularly long chain branching in the polymer. Long chain branching is desirable in many resin applications and this added degree of chemical property control enables the manufacture of "tailor made" polymers for certain applications.

EXAMPLE II

This example demonstrates several runs showing variations of initiators and pressures for desired ultimate product properties.

| Synthesis Conditions | Run Numbers | | | |
|---|---|---|---|---|
| | 3 | 4 | 5 | 6 |
| Reaction Pressure, p.s.i. | 30,000 | 30,000 | 27,000 | 21,000 |
| Modifier or Comonomer | Propylene | Hexane | Hexane | Hexane |
| Mole percent (range) | 0.7-1.10 | 0.75-1.05 | 0.74-1.00 | 0.91-1.6 |
| Initiator Composition (Molar basis): | | | | |
| First injection point: | | | | |
| Lauroyl peroxide | 4.0 | 4.0 | 3.1 | 2.0 |
| t-Butyl peroxyisobutyrate | 2.53 | 2.53 | 3.5 | 1.6 |
| t-Butyl peroxyacetate | 1.0 | 1.0 | 1.0 | 1.0 |
| t-Butyl peroxide | 0.38 | 0.38 | 0.38 | 0.63 |
| Second injection point: | | | | |
| Lauroyl peroxide | 0 | 0 | 0 | 0 |
| t-Butyl peroxyisobutyrate | 0 | 0 | 0 | 0 |
| t-Butyl peroxyacetate | 1.0 | 1.0 | 1.0 | 1.0 |
| t-Butyl peroxide | 0.16 | 0.16 | 0.09 | 0.5 |
| Injection Temperature ° F. (range): | | | | |
| First point | 320-332 | 337-342 | 337-343 | 305-310 |
| Peak Temperature ° F. (after first injection point) (range) | 550-554 | 550-557 | 540-556 | 535-540 |
| Injection Temperature ° F. (range): | | | | |
| Second point | 485-495 | 430-490 | 454-494 | 510-515 |
| Peak Temperature ° F. (after second injection point) (range) | 519-530 | 530-538 | 508-521 | 540-550 |
| Conversion, percent | 11.9 | 15.5 | 14.1 | 13.5 |
| Polymer Characteristics: | | | | |
| Density, gm./cm.³ at 23° C | .923 | .924 | .923 | .921 |
| Melt Index (gm./10 min.) range | 3.0-6.0 | 2.3-6.3 | 4.0-7.9 | 16-30 |

In the above runs, the significant increase in conversion between Runs 3 and 4 was due to unequal (less for Run 4) amounts of ethylene fed to the reactor. The four runs presented indicate a change in the variables: initiator mole ratios for the first and second injection points, pressures used and type of comonomer-modifier. The ranges reported in all of the runs above indicate that mole percent of comonomer-modifier was varied during the runs, as well as injection temperatures.

In all of the runs presented above, a Type II initiator was arbitrarily chosen as a reference for comparison of molar ratios. Where an initiator of Type II is not used, then the molar ratios of Types I and III are selected on the basis of ultimate polymer properties desired. Thus, in other runs where only two initiators are employed at the first injection point, the molar ratio is selected on the basis of ultimate polymer characteristics desired. Where a third injection point is employed in a polymerization reaction in accordance herewith, then the types and molar ratios of initiators can be readily selected by applications of the general and specific teachings of this invention.

Various additives, fillers, etc., such as antioxidants, slip and anti-block agents can be added to the polymer compositions of this invention as is known in the art.

Resort may be had to modifications of this invention falling within the spirit of this disclosure and the scope of the appended claims.

What is claimed is:

1. A process for polymerizing ethylene in a tubular reactor at pressures of at least 15,000 p.s.i. and at temperatures which rise, due at least in part to the heat generated by the polymerization reaction, from about 225° F. to as high as 600° F., said tubular reactor containing along the length thereof at least first and second spaced apart peroxide initiator introduction points, the ethylene being continuously introduced at one end of the reactor, said process comprising continuously introducing a first mixture of at least three peroxide initiators at the first introduction point to cause a first polymerization temperature curve rise, and a second mixture of at least two peroxide initiators at the second introduction point to cause a second polymerization temperature curve rise, said first mixture of initiators having a major proportion of initiators having a 10 half-life at temperatures of from 110° to 175° F. and distinct but overlapping decomposition temperature ranges, said second mixture of initiators having a major proportion of initiators having a 10 hour half-life at temperatures of above 175° F. and distinct but overlapping decomposition temperature ranges, said second mixture of peroxide initiators being introduced after cooling the ethylene polymerization reaction from the first polymerization temperature rise occurring after introduction of said first mixture of peroxide initiators.

2. The process of claim 1 wherein the major proportion of initiators having a 10 hour half-life at temperatures of from 110° to 175° F. is selected from the group consisting of 2,4-dichlorobenzoyl peroxide, caproyl peroxide, lauroyl peroxide, t-butyl peroxyisobutyrate, benzoyl peroxide, p-chlorobenzoyl peroxide, diisopropyl peroxydicarbonate, acetyl peroxide, decanoyl peroxide and t-butyl peroxypivalate.

3. The process of claim 1 wherein the major proportion of initiators having a 10 hour half-life at temperatures of above 175° F. is selected from the group consisting of t-butyl peroxyacetate, t-butyl peroxybenzoate, cumyl peroxide, diethyl dioxide, t-butyl hydroperoxide, methyl ethyl ketone peroxide, di-t-butyl diperoxyphthalate, hydroxyheptyl peroxide, cyclohexanone peroxide, p-menthane hydroperoxide, pinane hydroperoxide, cumene hydroperoxide, t-butyl peroxide and 2,5-dimethyl hexane-2,5-dihydroperoxide.

4. A process for polymerizing ethylene in a tubular reactor at pressures of at least 15,000 p.s.i. and at temperatures which rise, due at least in part to the heat generated by the polymerization reaction, from about 225° F. to as high as 600° F., said tubular reactor containing along the length thereof at least first and second spaced apart peroxide initiator introduction points, the ethylene being continuously introduced at one end of the reactor, said process comprising continuously introducing a first mixture of at least three peroxide initiators at the first introduction point to cause a first polymerization temperature curve rise, and a second mixture of at least two peroxide initiators at the second introduction point to cause a second polymerization temperature curve rise, said first mixture of initiators having a major proportion of initiators selected from the group consisting of decanoyl peroxide, lauroyl peroxide, benzoyl peroxide, t-butyl peroxyisobutyrate and diisopropyl peroxydicarbonate, said initiators having a 10 hour half-life at temperatures of from 110° to 175° F. and distinct but overlapping decomposition temperature ranges, said second mixture of initiators having a major proportion of initiators selected from the group consisting of t-butyl peroxyacetate and t-butyl peroxide, said initiators having a 10 hour half-life at temperatures of above 175° F. and distinct but overlapping decomposition temperature ranges, said second mixture of peroxide initiators being introduced after cooling the ethylene polymerization reaction from the first polymerization temperature rise occurring after introduction of said first mixture of peroxide initiators.

References Cited by the Examiner

FOREIGN PATENTS 583,805 12/1946 Great Britain.
921,542 3/1963 Great Britain.

JOSEPH L. SCHOFER, *Primary Examiner.*

JAMES A. SEIDLECK, *Examiner.*

M. B. KURTZMAN, *Assistant Examiner.*